(12) United States Patent
Yoshida

(10) Patent No.: US 10,009,113 B2
(45) Date of Patent: Jun. 26, 2018

(54) OPTICAL TRANSMITTING DEVICE, OPTICAL COMMUNICATION SYSTEM AND OPTICAL TRANSMISSION METHOD

(71) Applicant: FUJITSU LIMITED, Kawasaki-shi, Kanagawa (JP)

(72) Inventor: Setsuo Yoshida, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/383,247

(22) Filed: Dec. 19, 2016

(65) Prior Publication Data
US 2017/0222723 A1    Aug. 3, 2017

(30) Foreign Application Priority Data
Jan. 28, 2016    (JP) .................. 2016-014905

(51) Int. Cl.
*H04B 10/40* (2013.01)
*H04B 10/516* (2013.01)
*H04B 10/70* (2013.01)
*H04B 10/85* (2013.01)

(52) U.S. Cl.
CPC ........... *H04B 10/516* (2013.01); *H04B 10/70* (2013.01); *H04B 10/85* (2013.01)

(58) Field of Classification Search
CPC .......................... H04B 10/516; H04B 10/85
See application file for complete search history.

(56) References Cited

U.S. PATENT DOCUMENTS

| | | | | |
|---|---|---|---|---|
| 5,123,059 A | * | 6/1992 | Hirosawa | H04N 1/4072 341/50 |
| 2008/0095544 A1 | * | 4/2008 | Fuse | H04B 10/541 398/202 |
| 2008/0181329 A1 | * | 7/2008 | Ikushima | H04K 1/02 375/286 |

FOREIGN PATENT DOCUMENTS

| | | |
|---|---|---|
| JP | 2011-061292 | 3/2011 |
| JP | 2012-074980 | 4/2012 |

\* cited by examiner

*Primary Examiner* — Shi K Li
(74) *Attorney, Agent, or Firm* — Fujitsu Patent Center

(57) ABSTRACT

An optical transmitting device includes: a symbol determining circuit that determines one base from a plurality of bases for each input of plain text corresponding to one symbol and determines a modulation position of the symbol according to the plain text and the base; a shift circuit that randomly shifts the modulation position within a signal identification region set based on the base; and a modulator that modulates light emitted from a light source, according to a shifted position shifted by the shift circuit.

18 Claims, 15 Drawing Sheets

PHASE FLUCTUATION OF 90 DEGREES IN ONE TIME SLOT (DURATION OF ONE SYMBOL)

T

AREA OF HATCHED REGION
= PROBABILITY THAT EAVESDROPPER CORRECTLY INFERS SYMBOL TRANSMITTED FROM NORMAL TRANSMITTER

IN ACTUAL TRANSMISSION OF SYMBOLS, THESE STATES ARE SELECTED AT SAME PROBABILITY.

DISTRIBUTION APPEARS TO EAVESDROPPER TO BE STATISTICAL MIXED STATE OF DISTRIBUTIONS IN FIGs. 5A AND 5B.

FIG. 12

| OUTPUT OF SECOND LIGHT RECEIVING UNIT | OUTPUT OF FIRST LIGHT RECEIVING UNIT | VALUE RECORDED IN MEMORY (DECISION RESULT) |
|---|---|---|
| 0 | 0 | NOT RECORDED |
| 0 | 1 | 0 |
| 1 | 0 | 1 |
| 1 | 1 | NOT RECORDED |

…

OPTICAL TRANSMITTING DEVICE, OPTICAL COMMUNICATION SYSTEM AND OPTICAL TRANSMISSION METHOD

CROSS-REFERENCE TO RELATED APPLICATION

This application is based upon and claims the benefit of priority of the prior Japanese Patent Application No. 2016-014905, filed on Jan. 28, 2016, the entire contents of which are incorporated herein by reference.

FIELD

The embodiments discussed herein are related to an optical transmitting device, an optical communication system and an optical transmission method.

BACKGROUND

A cryptography method that uses quantum mechanics includes Yuen quantum cryptography. The protocol for Yuen quantum cryptography is called Y-00. It conceals an optical signal that has been subjected to intensity modulation or phase modulation by using the quantum fluctuation (noise) of laser light to diffuse the signal. Quantum cryptography is cryptography in which a physical phenomenon is used. Quantum cryptography takes a less time in encryption and decryption and is superior in resistance to eavesdropping when compared with mathematical cryptography.

A related technology is disclosed in Japanese Laid-open Patent Publication No. 2011-61292 or Japanese Laid-open Patent Publication No. 2012-74980.

SUMMARY

According to an aspect of the embodiments, an optical transmitting device includes: a symbol determining circuit that determines one base from a plurality of bases for each input of plain text corresponding to one symbol and determines a modulation position of the symbol according to the plain text and the base; a shift circuit that randomly shifts the modulation position within a signal identification region set based on the base; and a modulator that modulates light emitted from a light source, according to a shifted position shifted by the shift circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 illustrates an example of decision rules;

DESCRIPTION OF EMBODIMENTS

Figure 1:
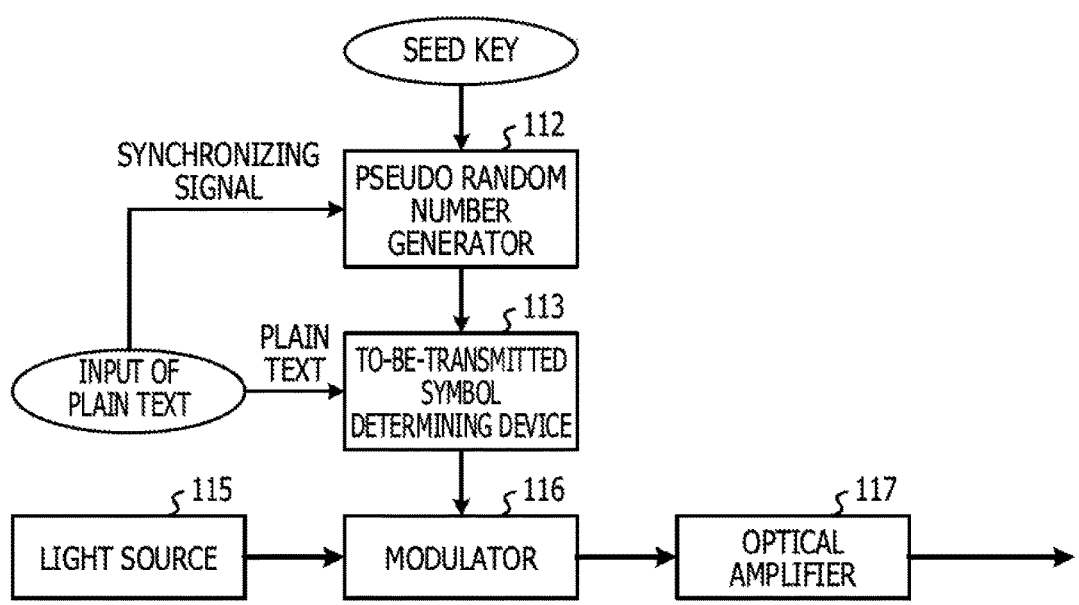
FIG. 1 illustrates an example of an optical communication quantum cryptographic optical transmitting device.
Figure 2:
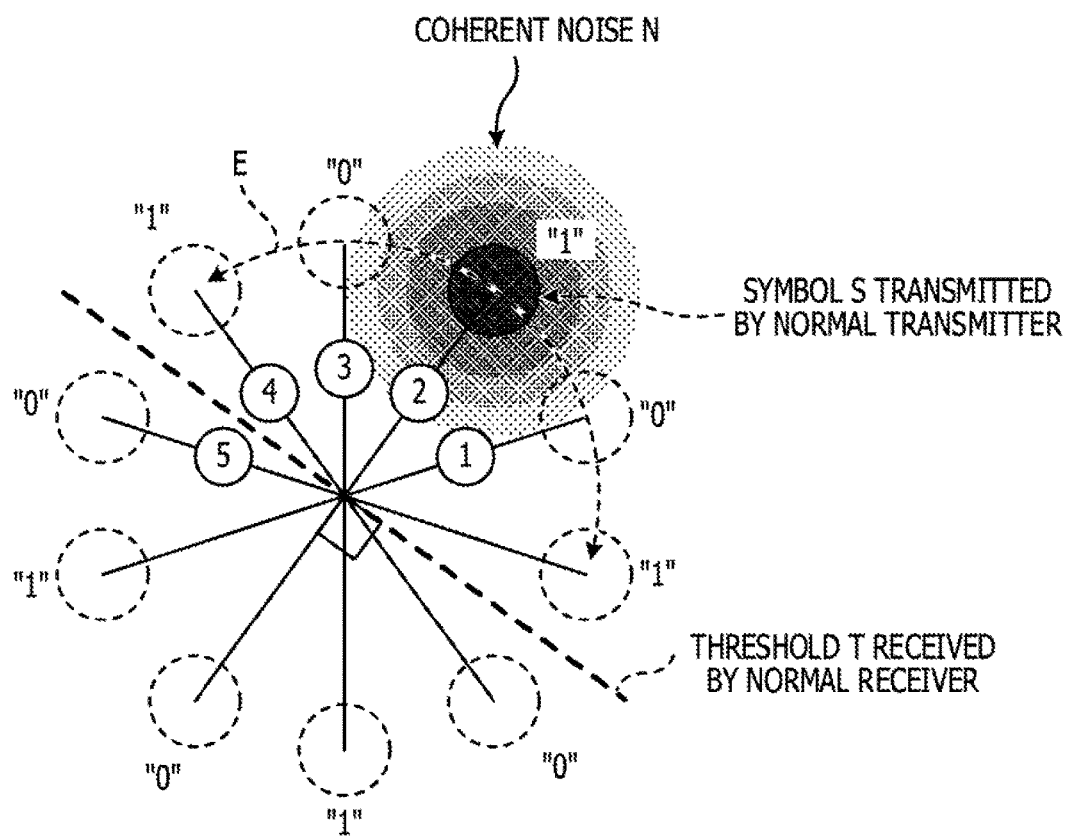
FIG. 2 illustrates an example of a Y-00 optical communication quantum cryptography.

FIG. 1 illustrates an example of an optical communication quantum cryptographic optical transmitting device. The optical transmitting device illustrated in FIG. 1 is an optical transmitting device based on the Y-00 protocol. FIG. 2 illustrates an example of a Y-00 optical communication quantum cryptography. A normal transmitter and receiver share a seed key, and the optical transmitting device has a pseudo random number generator 112 synchronized with a device on the reception side. The pseudo random number generator 112 creates a pseudo random number from the seed key for each bit in plain text and outputs the pseudo random number in synchronization with a plain text input. In FIG. 2, any one of pseudo random numbers 1 to 5 is output in each transmission of one bit in plain text. A to-be-transmitted symbol determining device 113 selects a base corresponding to the pseudo random number from a plurality of bases (M bases) and determines two symbols. A base is a group of a plurality of symbols. A base is, for example, a group of two symbols as illustrated in FIG. 2. In the case of phase modulation, pairs of two symbols that differ in phase by 180 degrees from each other as illustrated in FIG. 2 are assigned so that each pair of symbols has phases that differ for each pseudo random number. In the case of intensity modulation, pairs of two symbols having intensities away from each other are assigned so that each pair of symbols has different intensity levels for each pseudo random number. Two symbols of each base are assigned plain texts 0 and 1. A modulator 116 modulates light emitted from a light source 115, according to determined symbols. Modulated light is amplified by an optical amplifier 117 and is output to an optical transmission path.

In FIG. 2, an example of 10 PSKs is illustrated in which five bases (M=5) represents 10 (2×M) phase modulation states. Adjacent symbols are alternately assigned 0 and 1 so that their corresponding plain texts do not have the same value. The inter-symbol distance is set to a value small enough to suppress an eavesdropper from identifying a signal due to photon fluctuation (coherent noise N) of coherent light. For example, a symbol S corresponding to plain text 1 is transmitted from the normal transmitter by using a base 2 corresponding to pseudo random number 2. On the normal receiver side, the same pseudo random number 2 is created from the seed key in synchronization with the optical transmitting device and the base 2 is identified. The normal receiver sets an axis orthogonal to the base 2 as a threshold T used for symbol identification. By changing the threshold T used for symbol identification for each bit according to a pseudo random number, the normal receiver can decide, at a high signal-to-noise (S/N) ratio, whether the plain text corresponding to the transmitted symbol is 1 or 0. Since the eavesdropper does not know the pseudo random number, it is difficult for the eavesdropper to identify the selected base. Even if the eavesdropper can measure (intercept) signal light, since the signal light is buried in coherent noise, it is difficult for the eavesdropper to correctly infer a symbol position, in the range E indicated by a dashed line, from which the signal has been transmitted. The error rate becomes higher than ½.

For example, to increase confidentiality in quantum cryptography by a pulse position modulation method, a decoy signal is superimposed on a pulse position modulation signal. For example, a distribution of quantum shot noise is corrected so as to expand optical signal level intervals while the degree of effect of quantum noise is maintained at a certain value independently of the distance from the true optical signal level.

In encrypted communication in which quantum fluctuation is used, the inter-symbol distance is shortened to make it difficult for an eavesdropper to identify a signal point. Therefore, an amplitude (corresponding to the distance from the origin to the symbol) in the electric field of the optical signal is short as in the constellation in FIG. 2. An amplitude in an electric field is proportional to the intensity of light, that is, the number of photons. If the number of photons per symbol is reduced to maintain confidentiality, the output power of the modulator 116 is reduced, in which case an application to long-distance optical transmission may become difficult. If the number of photons is increased to increase light intensity, it becomes difficult to sufficiently use uncertainty due to quantum fluctuation, which may make it difficult to maintain confidentiality.

Figure 3:
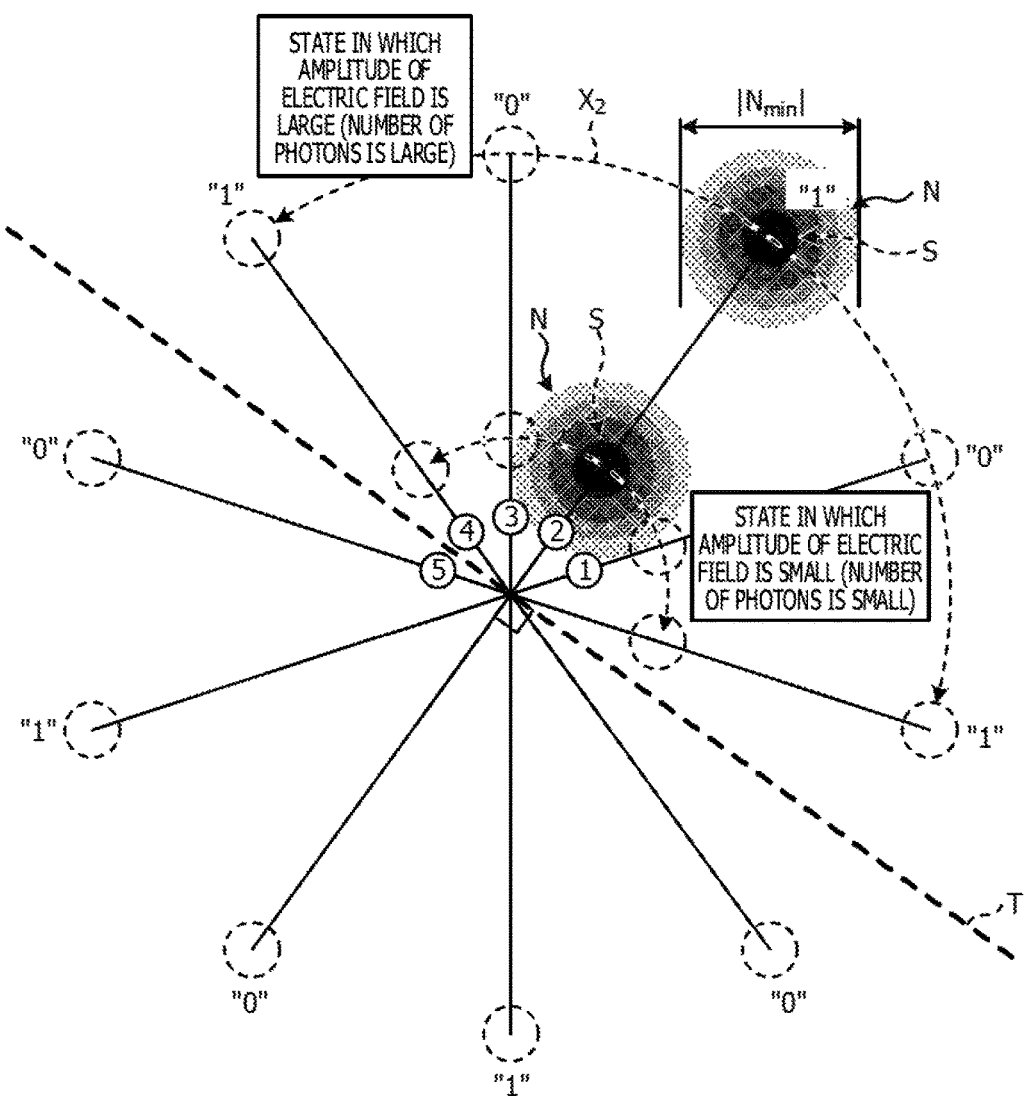
FIG. 3 illustrates an example of a tradeoff relationship between an increase in the number of photons and confidentiality.

FIG. 3 illustrates an example of a tradeoff relationship between an increase in the number of photons and confidentiality. At a position close to the origin O of the constellation, the amplitude of the electric field, that is, the number of photons per symbol, is small and the distance between each two adjacent symbols is short. Due to uncertainty caused by quantum fluctuation, probability densities at which a signal is present become the same among a plurality of signal points. Since it is difficult for an eavesdropper who does not know the pseudo random number to set the threshold T used for signal identification, even if the eavesdropper can measure the optical signal, it is difficult for the eavesdropper to correctly infer the plain text corresponding to the symbol that has been actually transmitted.

As distances from the origin O of the constellation become longer, the amplitude of the electric field, that is, the number of photons per symbol, becomes larger and the distance between each two adjacent symbols also becomes longer. If the minimum value |N min| of the amount of quantum fluctuation, which is, for example, noise derived from coherent noise, is increased, even if the inter-symbol distance is prolonged, an error rate due to quantum fluctuation may become large. However, since the amount of noise |N min| that becomes the worst condition for the normal transmitter and receiver, which is, for example, the condition that becomes the most advantageous for the eavesdropper due to less noise, has a value determined by the uncertainty principle (Planck constant) proposed by Heisenberg, it is difficult to increase the amount of noise |N min|.

Figure 4:
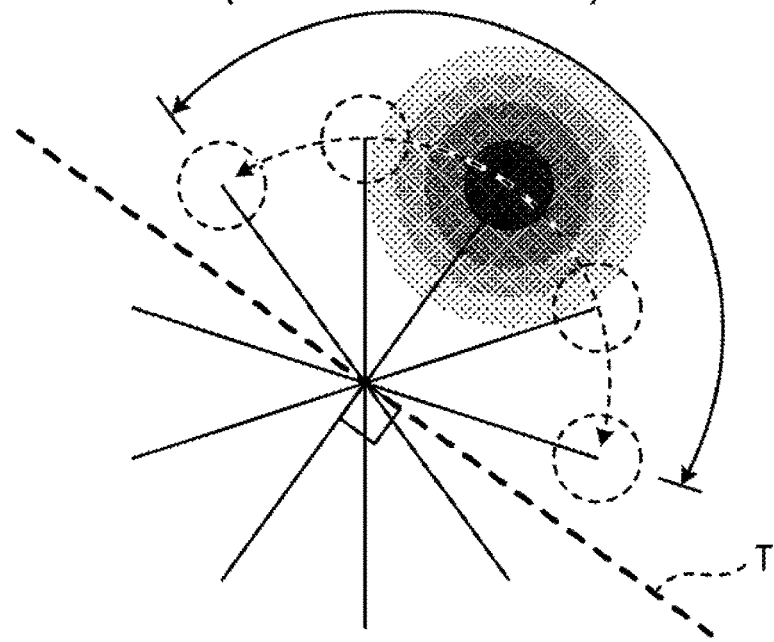
FIG. 4 illustrates an example of phase fluctuation.
Figure 4:
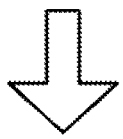
Figure 4:
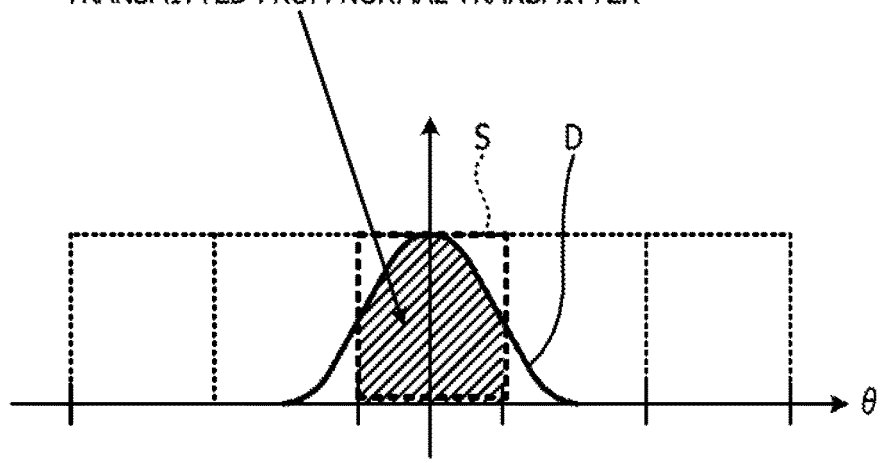

FIG. 4 illustrates an example of phase fluctuation. As illustrated in FIG. 4, phase fluctuation in the duration of one symbol (one time slot) is less than ±90 degrees with respect to the position from which the symbol has been transmitted. From the viewpoint of confidentiality for the normal transmitter and receiver, however, the phase fluctuation is preferably as close to ±90 degrees as possible within a range in which signal deterioration to the normal receiver can be neglected. However, when the number of photons becomes large, the full width at half maximum in a probability distribution becomes small, the probability distribution being used to correctly infer the symbol that the normal transmitter has transmitted. As a result, the area (hatched region) of a probability distribution function D included in a true symbol region S becomes large, so the probability at which an eavesdropper infers the symbol S may exceed ½.

When the number (2×M) of modulated symbols is increased to reduce the interval between each two adjacent symbols, the effect of quantum fluctuation may be enjoyed. However, an increase in the number of modulated symbols leads to a large impact on the system. If, for example, the number of modulated symbols is fixed to the upper limit in system design, there is an upper limit to a modulator output enough to maintain confidentiality, which is, for example, the number of photons (optical power) per symbol. If the number (2×M) of modulated symbols is, for example, 16, to increase the error rate to more than 0.5 for an eavesdropper who has the maximum symbol identification capability that is quantum-theoretically possible, it is desirable to reduce the number of photons to about less than 100 per symbol.

The average output optical power P of the modulator 116, which is, for example, input power to the optical amplifier 117 (see FIG. 1) at the first stage is represented by the equation below.

$$P = N_p \times h \times v \times R [W]$$

where $N_p$ is the number of photons included in one symbol, h is the Planck constant, v is an optical frequency [Hz], and R is the symbol rate.

Under the following conditions

Planck constant $h = 6.626070 \times 10^{-34}$ [Js]

Optical frequency $v = c/\lambda$ [Hz]

Velocity of light $c = 2.99792458 \times 10^8$ [m/s]

Wavelength $\lambda = 1550 \times 10^{-9}$ [m]

Symbol rate $R = 32$ [Gbaud] $= 32 \times 10^9$ [baud]

Number of photons in one symbol $N_P = 100$

Then, the average optical power P is about 0.41 [μW], that is, −33.9 [dBm]. If confidentiality is maintained by reducing the number $N_P$ of photons included in one symbol is reduced to less than 100, the average output optical power of the modulator 116 or the input optical power to the optical amplifier 117 at the first stage is reduced. In this case, the S/N ratio is reduced for the normal transmitter and receiver as well, so a tradeoff may occur between confidentiality and signal quality.

Figure 5A:
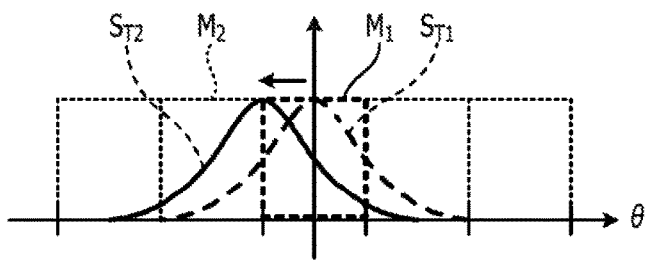
FIGS. 5A to 5C illustrate examples of quantum encryption.
Figure 5B:
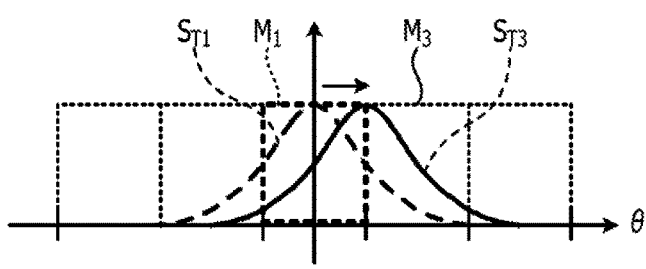
Figure 5C:
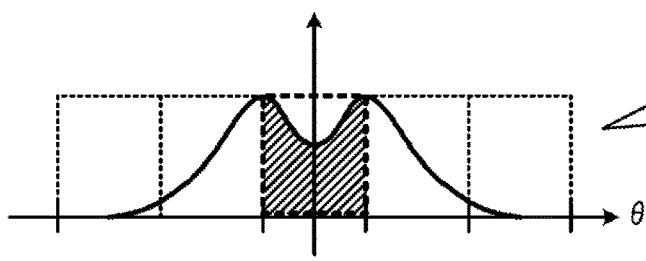

For example, an encryption method and an optical transmitting device may be provided that can maintain confidentiality even if the number of photons per symbol is increased. The structures and method described below may contribute to an application to long-distant optical communication in cryptographic communication. FIGS. 5A to 5C illustrate examples of quantum encryption. In FIGS. 5A to 5C, the symbol modulation position determined according to the selected base is randomly shifted for each symbol transmission within a signal identification region (region determined by the threshold T) set by the normal receiver.

For example, a symbol modulation position, in multi-level modulation, that has been determined from the base selected according to a pseudo random number and plain text corresponding to one entered symbol is randomly shifted. The random shift of the modulation position after the determination of the base may be carried out according to, for example, a physical random number.

In FIGS. 5A and 5B, the rectangle M1 indicated by bold dashed lines is the symbol region of a phase-modulated symbol for the normal transmitter. The Gaussian curve $S_{T1}$ indicated by a dashed line is a probability distribution in which a measured value become θ, the measured value being obtained when a symbol is transmitted in M1 and an eavesdropper measures the phase of the transmitted symbol.

FIG. 5A illustrates a state in which a symbol intended to be transmitted in M1 is shifted to a symbol region M2, which is left adjacent to M1, and is transmitted in M2. The Gaussian curve $S_{T2}$ indicated by a solid line is a probability distribution in which a measured value become θ, the measured value being obtained when an eavesdropper measures the phase of an actually transmitted symbol. FIG. 5B illustrates a state in which a symbol intended to be transmitted in M1 is shifted to a symbol region M3, which is right adjacent to M1, and is transmitted in M3. The Gaussian curve $S_{T3}$ indicated by a solid line is a probability distribution in which a measured value become θ, the measured value being obtained when an eavesdropper measures the phase of a transmitted symbol.

Whether a symbol is to be transmitted in the state in FIG. 5A or the state in FIG. 5B may be randomly determined for each symbol by using a physical random number generator, a pseudo random number generator that does not share a seed value, or another device. If symbols are transmitted while the state in FIG. 5A and the state in FIG. 5B are generated at the same probability, a probability distribution of θ appears to the eavesdropper to be a statistical mixed state illustrated in FIG. 5C. When the modulation position of the true symbol is randomly shifted, even if the effect of quantum fluctuation is relatively reduced due to an increase in the number of photons, the probability that an eavesdropper infers the true symbol may become smaller than ½.

FIGS. 5A and 5B illustrate examples in which the true symbol region M1 determined from the selected base is shifted to the midpoint between the true symbol region M1 and the left adjacent symbol region M2 or to the midpoint between the true symbol region M1 and the right adjacent symbol region M3. For example, the true symbol region M1 may not be shifted to the midpoint between the true symbol region M1 and its adjacent symbol area at all times. The modulation position determined from the base each time one symbol is transmitted may be randomly shifted within the symbol identification region (region set by the threshold T) that is set by the normal receiver. This may not indicate that the modulation position is changed in succession while one symbol is being transmitted. When the shift-to modulation position of a symbol is changed is randomly determined on a per-symbol basis, the symbol is transmitted at the shift-to position as long as the transmission of the one symbol is in progress.

Figure 6:
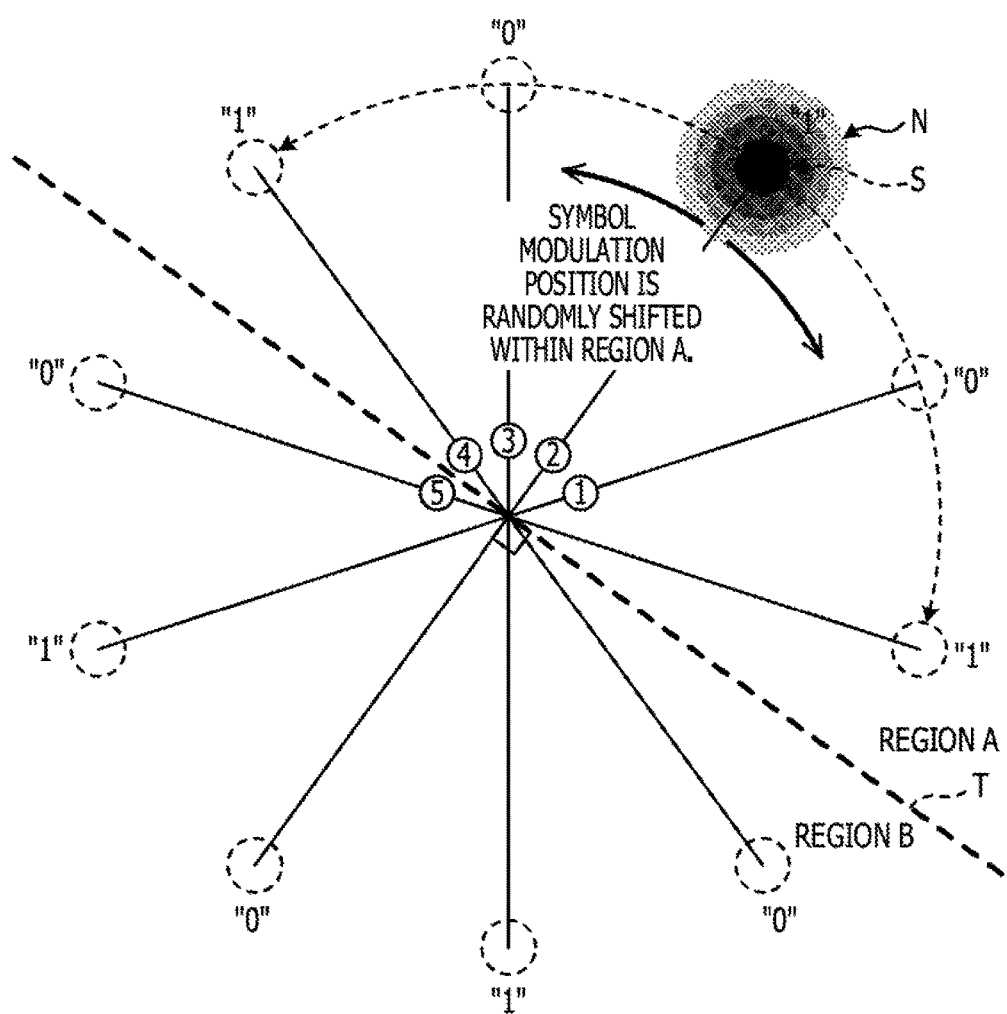
FIG. 6 illustrates an example of quantum encryption.

FIG. 6 illustrates an example of quantum encryption. In FIG. 6, a method is illustrated by which a symbol modulation position is randomly shifted when the number of photons is increased. When the number of photons per symbol is increased, the amplitude of the electric field during signal transmission becomes larger and the average output optical power of the modulator 116 is increased. To solve the problem of a reduction in confidentiality due to an increase in the number of photons, the symbol modulation position determined from the selected base and the value of plain text corresponding to one symbol may be shifted to an arbitrary position in a symbol identification region A set by the normal receiver. When, for example, a symbol corresponding to plain text 1 is transmitted by using the base 2 corresponding to pseudo random number 2, the true symbol modulation position (θ) is shifted to the midpoint between the symbol and the right adjacent symbol or the midpoint between the symbol and the left adjacent symbol, as illustrated in FIG. 5B. Whether the symbol is shifted to the midpoint between the symbol and the right adjacent symbol or the midpoint between the symbol and the left adjacent symbol may be randomly determined according to a physical random number or a pseudo random number that does not share a seed value with the normal receiving device.

For example, the true symbol modulation position (θ) may be shifted to a position close to an adjacent symbol, as illustrated in FIG. 6. In this case as well, whether the true symbol modulation position (θ) is shifted to a position close to the right adjacent symbol or left adjacent symbol may be randomly determined according to a physical random number or a pseudo random number that does not share a seed value. A shift-to modulation position may be shifted beyond the position of an adjacent symbol as long as the shift-to modulation position is within the symbol identification region A. The symbol is transmitted at the modulation position to which the symbol has been shifted.

Since the normal receiver uses a shared seed key to create a pseudo random number in synchronization with the transmission side, the normal receiver may set the symbol identification region A according to the threshold T determined from the selected base. Even if a symbol has been transmitted from a position shifted from the true symbol modulation position, which is determined from the base and plain text corresponding to one symbol, the plain text corresponding to the symbol is decided to be 1 as long as the symbol is received in the symbol identification region A. If the symbol is received in a symbol identification region B at the timing of pseudo random number creation, the plain text corresponding to the symbol is decided to be 0. Similarly, if a base 3 has been selected, the threshold T orthogonal to the base 3 is set. If the symbol is received in the symbol identification region A, the plain text corresponding to the symbol is decided to be 0. If the symbol is received in the symbol identification region B, the plain text corresponding to the symbol is decided to be 1.

When the number of photons per symbol is large, quantum fluctuation becomes relatively small, so an eavesdropper may measure the symbol position. However, as described with reference to FIGS. 5A to 5C, the probability that the original modulation position of the symbol is inferred may be small. Unlike the normal receiver, the eavesdropper does not know the pseudo random number, so the threshold T used for signal identification may not be set. As a result, even if the number of photons is increased, confidentiality in communication may be maintained.

Figure 7A:
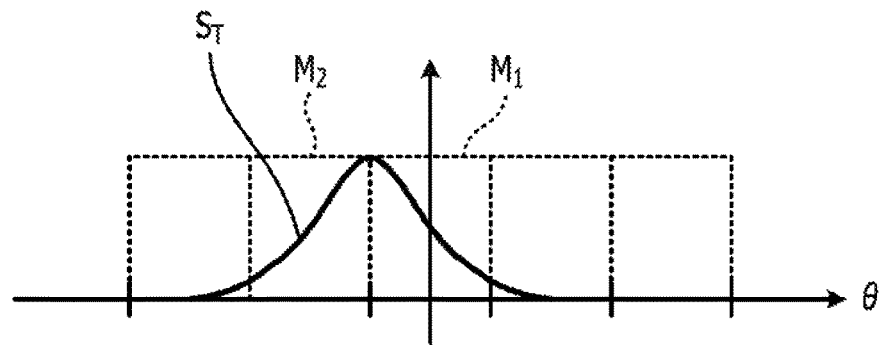
FIGS. 7A to 7C illustrate examples of quantum encryption.
Figure 7B:
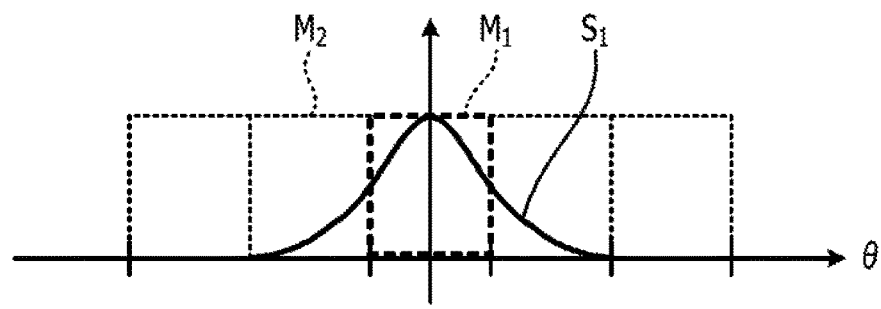
Figure 7C:
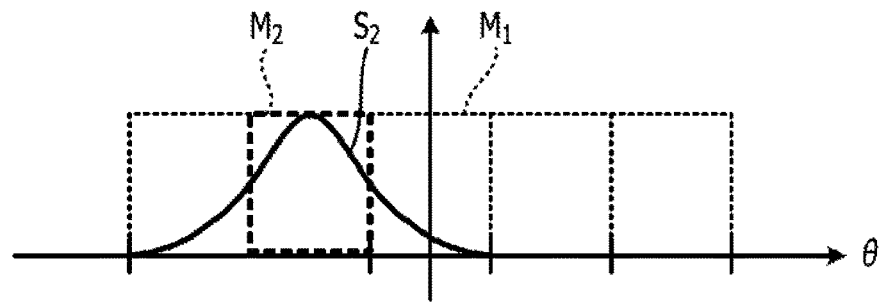

FIGS. 7A to 7C illustrate examples of quantum encryption. In FIGS. 7A to 7C, quantum encryption in FIGS. 5A to 5C is illustrated from a different viewpoint. If an eavesdropper performs eavesdropping (measures the phase θ), signal light is detected at a point on the θ axis as illustrated in FIG. 7A. Therefore, the eavesdropper infers the phase θ of the received light on a probability distribution $S_T$. However, it is difficult for the eavesdropper to know whether the original symbol region is M1 and it had been shifted to M2 before the symbol has been transmitted as illustrated in FIG. 7B or the original symbol region is M2 and it had been shifted to M1 before the symbol has been transmitted as illustrated in FIG. 7C.

If the probability distribution of the probability that a measured value in the measurement of the phase of received light become θ is $S_T$, the probability that the symbol is inferred in the original symbol region M1 or M2 becomes small and the error ratio becomes large. Therefore, even if the effect of quantum fluctuation becomes relatively small due to an increase in the number of photons per symbol, confidentiality may be maintained. Since the average output optical power of the modulator 116 can be increased, the normal receiver may receive signal light with a high S/N ratio while confidentiality is maintained.

Figure 8:
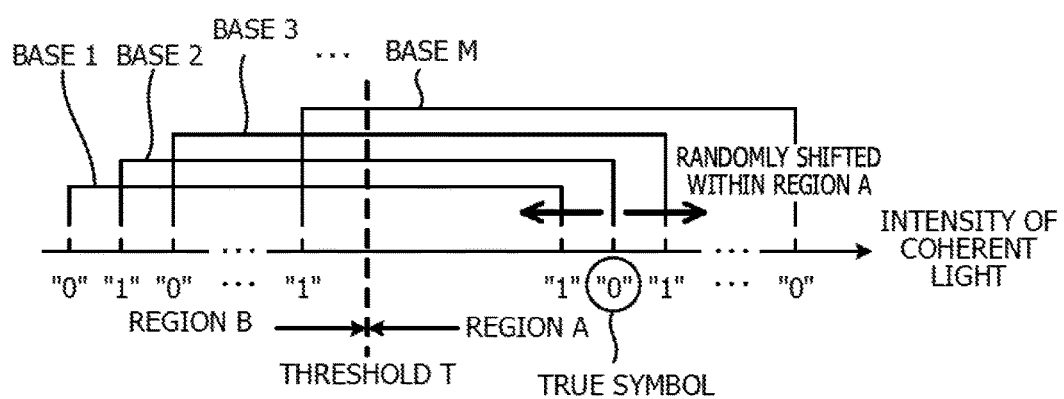
FIG. 8 illustrates an example of an application of quantum encryption to intensity modulation.

FIG. 8 illustrates an example of an application of quantum encryption to intensity modulation. A plurality of bases (M bases) are prepared at different intensity levels instead of setting a plurality of bases at different phases. Each base is assigned two intensity-modulated symbols corresponding to plain text values 1 and 0 are assigned, and a total of 2×M intensity-modulated symbols are used. The symbols are placed so that their corresponding plain text values 1 and 0 are alternately assigned to adjacent symbols.

The normal transmitter and receiver share the same seed key so that the same pseudo random number is created in synchronization between the transmission side and the reception side. A base corresponding to the pseudo random number is selected from the M bases, and a modulation position is determined according to plain text corresponding to one symbol. The normal receiver knows the base. Therefore, an intensity level that is easily identified by minimizing the error probability for the two symbols of the base, which is, for example, the average of two intensities, is set as the threshold T used for symbol identification. The threshold T to be set may be changed for each symbol.

When, for example, the base 2 is selected in the transmission of a certain symbol, the center between the symbol position of a symbol with a weak intensity (the symbol corresponds to plain text 1), which is one of the two symbols of the base 2, and the symbol position of the other symbol with a strong intensity (the symbol corresponds to plain text 0) is set as the threshold T. If the value of the plain text corresponding to the true symbol to be transmitted is 0, on the transmission side, the modulation position of the symbol is randomly shifted to the right or left along the strength axis within the range of a region A determined from the threshold T, according to a physical random number or the like. The modulation position to which to shift the symbol may be the midpoint between the positions of the symbol and an adjacent symbol or may exceed the position of an adjacent symbol as long as the range of the region A is not exceeded.

If the normal receiver receives signal light in the region A at the timing of the generation of a pseudo random number, the normal receiver decides that the value of the plain text is 0, regardless of the intensity position of the signal light. Similarly, if the normal receiver receives signal light in the region B at the timing of the generation of a pseudo random number, the normal receiver decides that the value of the plain text is 1.

Since the eavesdropper does not know the base, even if the eavesdropper can measure signal light with a certain intensity, the eavesdropper may not be capable of correctly inferring the true symbol. Therefore, the corresponding plain text may not be inferred.

Figure 9:
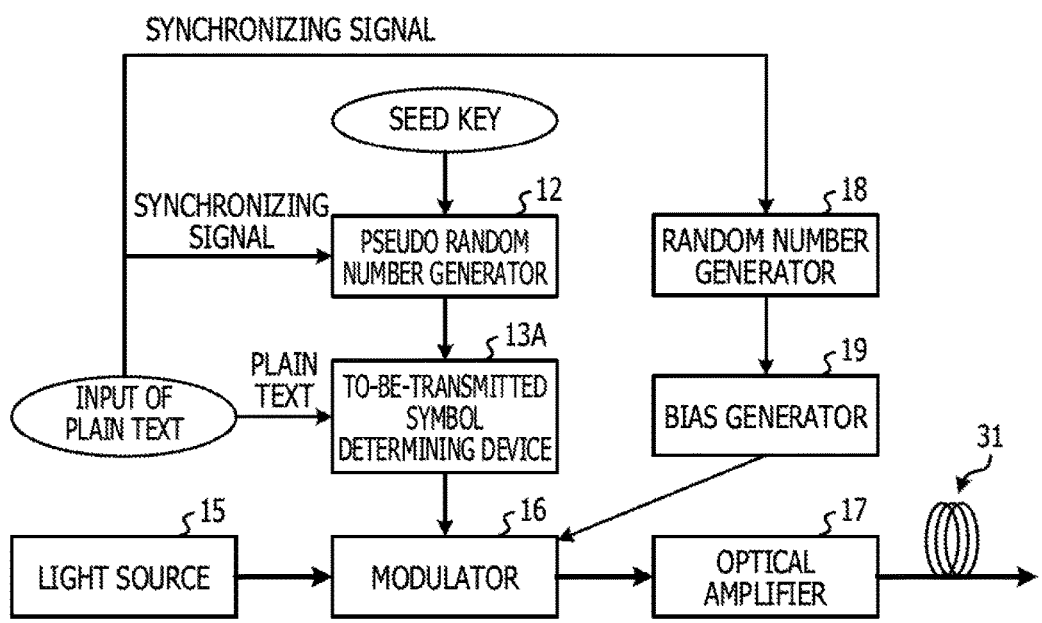
FIG. 9 illustrates an example of the structure of an optical transmitting device.

Even if the effect of quantum fluctuation becomes relatively small as a result of increasing the number of photons per symbol, confidentiality may be maintained by the method described above. Also, since the average output optical power of the modulator 116 becomes large, the normal receiver may receive signal light with a high S/N ratio. FIG. 9 illustrates an example of the structure of an optical transmitting device. The optical transmitting device 10A illustrated in FIG. 9 has a pseudo random number generator 12, a to-be-transmitted symbol determining device 13A, a light source 15, a modulator 16, an optical amplifier 17, a random number generator 18, and a bias generator 19. The random number generator 18 may be a physical random number generator or may be a pseudo random number generator that does not share a seed value with the normal receiving device.

Plain text represented by 1 or 0 is input to the to-be-transmitted symbol determining device 13A. A synchronizing signal is supplied to the pseudo random number generator 12 and random number generator 18 in synchronization with the input of the plain text. The pseudo random number generator 12 creates a binary pseudo random number string (bit string) by using a seed key and outputs the created pseudo random number string. The pseudo random number generator 12 may be, for example, a combination of a plurality of D-type flip-flop circuits and one exclusive OR (XOR) circuits, a circuit formed by a liner feedback shift register, a Blum-Blum-Shub pseudo random number generator, an advanced encryption standard (AES) cryptographic device in a CTR mode (counter mode), or the like. A known structure may be used as the pseudo random number generator 12. The number of bits in the binary pseudo random number string output by the pseudo random number generator 12 varies with the number of bases to be used. If, for example, five bases are used as illustrated in FIG. 6, a 3-bit pseudo random number string is output.

The to-be-transmitted symbol determining device 13A determines one base from a plurality of bases according to the pseudo random number string output from the pseudo random number generator 12. Each base represents a different phase or a different intensity level. According to the base decided as plain text corresponding to one symbol, a symbol to be transmitted is determined from a total of 2×M symbols. An adder, a multiplier, an XOR circuit, or another arbitrary circuit structure may be used as the to-be-transmitted symbol determining device 13A. The symbol determined to be transmitted is input to the modulator 16 as an electric driving signal.

The random number generator 18 creates a physical random number or a pseudo random number that does not share a seed value with the normal receiving device. A physical random number may be a value created by a random physical phenomenon such as thermal noise, a decay of radioactive elements, or polarization of a photon. To create a physical random number, an integrated circuit (IC) chip that uses thermal noise in a semiconductor, a random number generator that uses a semitransparent mirror, a chaos laser chip that uses a chaos phenomenon of a semiconductor laser, or the like may be used as the random number generator 18.

The created random number is input to the bias generator 19. The bias generator 19 creates a bias voltage according to the random number input to the bias generator 19, and inputs the bias voltage to the modulator 16. The bias generator 19 may function as a shift unit that randomly shifts a symbol modulation position, which is determined from plain text corresponding to one symbol and a selected base, in a predetermined region.

The modulator 16 modulates light emitted from the light source 15, according to the symbol determined to be transmitted by the to-be-transmitted symbol determining device 13A. The light source 15 may be, for example, a laser diode that outputs light with a wavelength of 1550 nm. Light emitted from the light source 15 is coherent light having a certain relationship with its phase and amplitude and has a probabilistic fluctuation (quantum fluctuation). If the number of photons is small, quantum fluctuation becomes noticeable. However, if the number of photons is increased, quantum fluctuation becomes relatively small. In the case of phase modulation illustrated in FIG. 6, the modulator 16 modulates the phase of light emitted from the light source 15, according to an electric driving signal output from the to-be-transmitted symbol determining device 13A. In a case as well in which intensity is modulated as illustrated in FIG. 8, the intensity of light emitted from the light source 15 is modulated by the modulator 16, according to the electric driving signal output from the to-be-transmitted symbol determining device 13A.

In the modulator 16, the modulation position suitable to the symbol determined by the to-be-transmitted symbol determining device 13A is randomly shifted by a bias voltage input from the bias generator 19 within a range in which the threshold is not exceeded, such as, for example, a symbol identification region. The modulated signal that has been randomly shifted is amplified by the optical amplifier 17 and is output to an optical transmission path 31.

A combination of an analog circuit and a field programmable gate array (FPGA) may be used as the pseudo random number generator 12 and to-be-transmitted symbol determining device 13A as structured above, instead of digital logical circuits. Alternatively, a microprocessor that executes predetermined software programs may be used.

Figure 10:
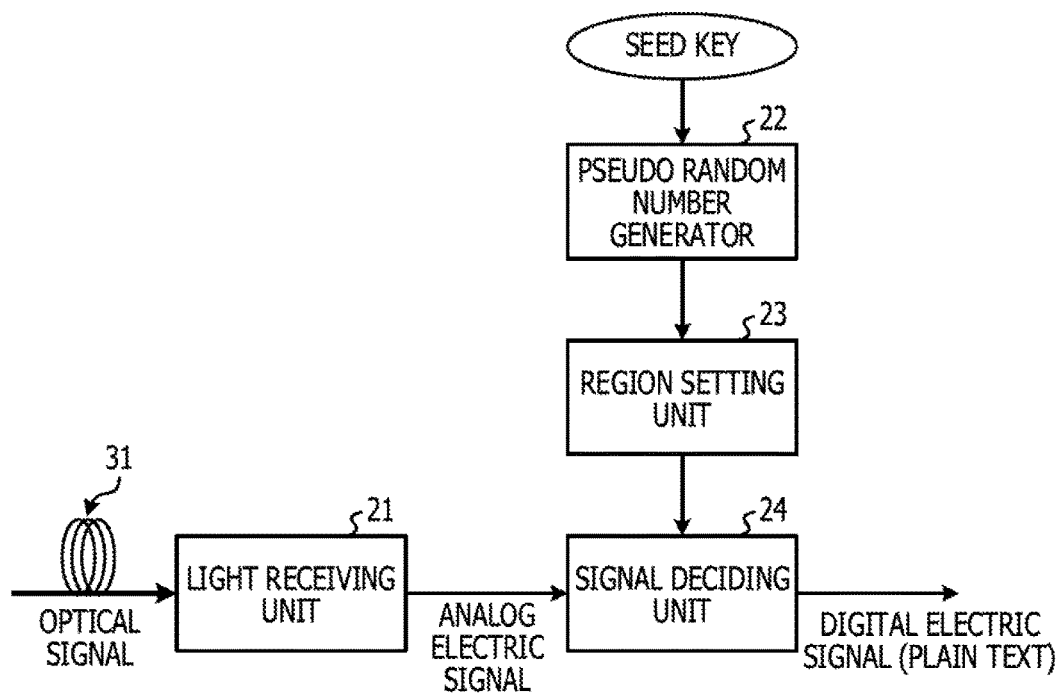
FIG. 10 illustrates an example of the structure of an optical receiving device.

FIG. 10 illustrates an example of the structure of an optical receiving device. In FIG. 10, the structure of an optical receiving device 20 used in an optical communication system is illustrated. The optical receiving device 20 has a light receiving unit 21, a pseudo random number generator 22, a region setting unit 23, and a signal deciding unit 24.

The light receiving unit 21 receives an optical signal from the optical transmission path 31. The light receiving unit 21 includes, for example, an optical device implemented by an optical waveguide and a spatial optical system, a photodetector such as a photodiode, a transimpedance amplifier that converts a current output from the photodetector to a voltage signal, and the like. An analog electric signal output from the light receiving unit 21 is input to the signal deciding unit 24.

The pseudo random number generator 22 uses a seed key shared with the optical transmitting device 10A to create a pseudo random number in synchronization with the optical transmitting device 10A. Since the pseudo random number generator 22 uses the same seed key as the optical transmitting device 10A, the same pseudo random number is created in the pseudo random number generator 22 as in the optical transmitting device 10A. The created pseudo random number is input to the region setting unit 23.

The region setting unit 23 selects one base from a plurality of bases, according to the pseudo random number that has been input. The region setting unit 23 sets the threshold T that identifies a received symbol or an area determined by the threshold T, according to the selected base.

The signal deciding unit 24 makes a decision on the received symbol, according to the threshold T or region that has been set and outputs a digital electric signal (plain text) representing 0 or 1.

The optical receiving device 20 uses the Y-00 protocol to decode quantum cryptography. A conventional technology may be used as the Y-00 protocol. Since a signal is transmitted in a state in which the number of photons per symbol is increased, a reception may be performed at a high S/N ratio.

Figure 11:
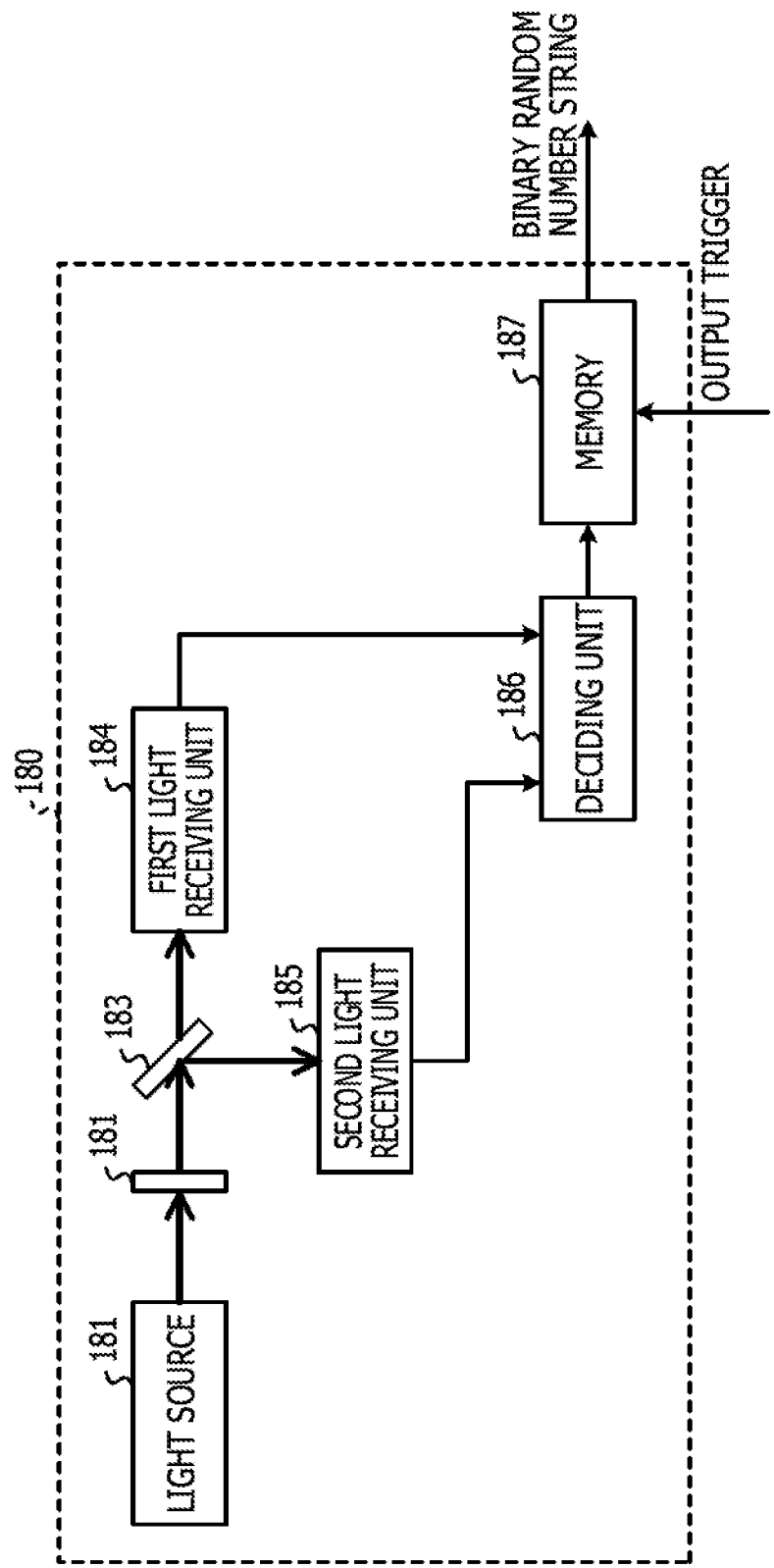
FIG. 11 illustrates an example of a physical random number generator.

FIG. 11 illustrates an example of a physical random number generator. In FIG. 11, a physical random number generator 180 that uses a semitransparent mirror is illustrated as an example of the random number generator 18. The physical random number generator 180 has a light source 181, an optical attenuator 182, a semitransparent mirror 183, a first light receiving unit 184, a second light receiving unit 185, a deciding unit 186, and a memory 187. The physical random number generator 180 is implemented as, for example, a module-type device.

The optical attenuator 182 attenuates light emitted from the light source 181 to a level at which photons are output one at a time. The semitransparent mirror 183 may be a mirror by which transmitted light and reflected light have the same power when a relative intensive light is incident. If photons are incident on the semitransparent mirror 183 one at a time, transmission and reflection occur at the same probability.

The first light receiving unit 184 and second light receiving unit 185 are each, for example, an avalanche photodiode or a photomultiplier tube. They can detect one photon. Upon the detection of a photon, the first light receiving unit 184 and second light receiving unit 185 output an electric pulse. Outputs from the first light receiving unit 184 and second light receiving unit 185 are connected to the inputs of the deciding unit 186.

The deciding unit 186 outputs a value selected according to predetermined rules to the memory 187, according to the electric pulse output from the first light receiving unit 184 and the electric pulse output from the second light receiving unit 185.

FIG. 12 illustrates an example of decision rules. In FIG. 12, rules set in the deciding unit 186 are illustrated. In FIG. 12, when a photon is detected in the first light receiving unit 184 and no photon is detected in the second light receiving unit 185, a random number output becomes 0. When a photon is detected in the second light receiving unit 185 and no photon is detected in the first light receiving unit 184, a random number output becomes 1.

When the outputs (electric pulses) from the first light receiving unit 184 and second light receiving unit 185 are both 0, this indicates that no photon has input or indicates a time when a photon has been absorbed by the semitransparent mirror 183 and has been converted to heat, so counting is not performed. When the outputs (electric pulses) from the first light receiving unit 184 and second light receiving unit 185 become 1 at the same time, this may be caused due to noise, so counting is not performed.

In FIG. 11, the memory 187 is, for example, an asynchronous first-in, first-out (FIFO) memory. A physical random number is asynchronously input from the deciding unit 186 to the memory 187. In the memory 187, the data of the physical random number is placed in a queue. When an output trigger is input to the memory 187, the physical random number is output as a binary random number string. The output trigger may be, for example, an output command signal or an output synchronous signal. The binary random number string output from the memory 187 becomes an output from the physical random number generator 180.

According to the value of the physical random number string, a shift-to position to which a symbol modulation position is shifted is specified within a range in which the threshold T determined from the base is not exceeded. Unlike, a pseudo random number, a physical random number is completely random, so it may be difficult for an eavesdropper to infer the modulation position of the true symbol in a state after the shift. Therefore, even in a case in which the number of photons per symbol is increased, confidentiality in cryptography may be maintained.

Figure 13:
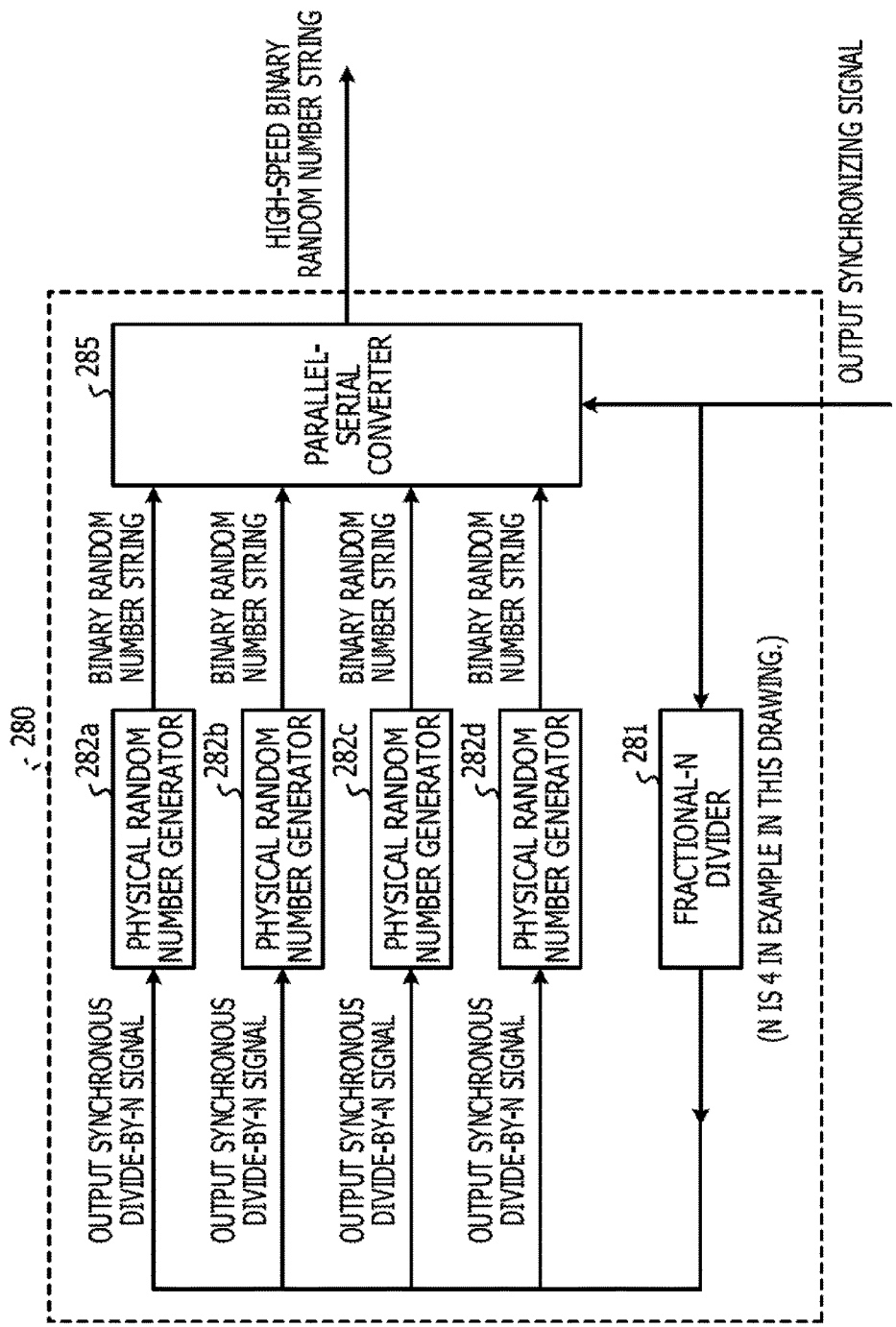
FIG. 13 illustrates an example of a physical random number generator.

FIG. 13 illustrates an example of a physical random number generator. In FIG. 13, a high-seed physical random number generator 280 is illustrated as the random number generator 18. The physical random number generator 280 has a plurality of low-speed physical random number generators 282a to 282d connected in parallel, a parallel-serial converter 285, and a fractional-N divider 281. Each of the physical random number generators 282a to 282d may be, for example, an IC chip that uses thermal noise in a semiconductor or the physical random number generator 180 in FIG. 11. Outputs from the physical random number generators 282a to 282d are connected to the inputs of the parallel-serial converter 285.

A high-speed output synchronous signal is input to the parallel-serial converter 285 and fractional-N divider 281. The fractional-N divider 281 converts the output synchronous signal to a 1/N clock frequency. In FIG. 13, N is 4. Synchronous divide-by-N signals are input to the physical random number generators 282a to 282d. Each of the physical random number generators 282a to 282d creates a physical random number in synchronization with the relevant divide-by-N clock signal and outputs a binary random number string at a speed equal to one-fourth the speed of the output synchronous signal.

The parallel-serial converter 285 converts the binary random number strings, which have been input in parallel from the physical random number generators 282a to 282d, to a serial random number string and outputs the serial random number string in synchronization with the high-speed output synchronous signal.

When the high-speed physical random number generator 280 illustrated in FIG. 13 is used, the speed of plain text input and the speed of pseudo random number creation in the pseudo random number generator 12 may be increased and the modulation speed may be improved.

Figure 14:
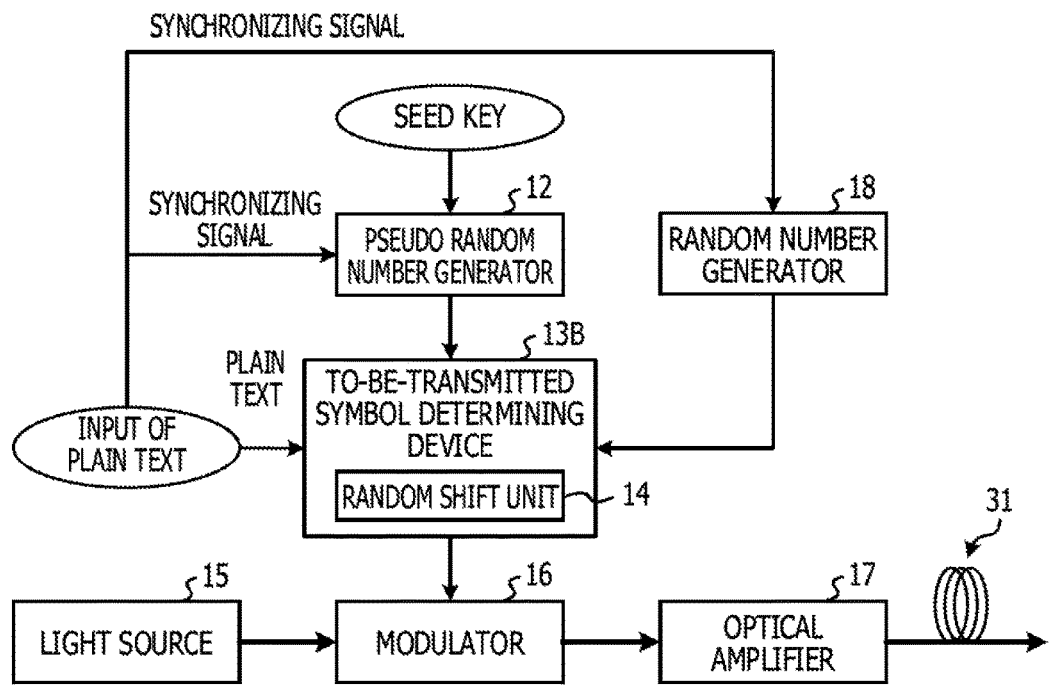
FIG. 14 illustrates an example of the structure of an optical transmitting device.

FIG. 14 illustrates an example of the structure of an optical transmitting device. In FIG. 14, the same constituent elements as those of the optical transmitting device 10A in FIG. 9 may be assigned the same reference numerals and repeated descriptions may be omitted. An optical transmitting device 10B has a pseudo random number generator 12, a to-be-transmitted symbol determining device 13B, a light source 15, a modulator 16, an optical amplifier 17, and a random number generator 18. The to-be-transmitted symbol determining device 13B has a random shift unit 14. The random number generator 18 is, for example, a physical random number generator.

In the optical transmitting device 10B, an output from the random number generator 18 is input to the to-be-transmitted symbol determining device 13B. The to-be-transmitted symbol determining device 13B selects a base according to a pseudo random number from the pseudo random number generator 12, in synchronization with an input of plain text corresponding to one symbol. In synchronization with this, a random number created in the random number generator 18 is input to the random shift unit 14. The random shift unit 14 randomly shifts a symbol modulation position determined by the base and the plain text corresponding to one symbol to another modulation position within a range in which the threshold T determined from the base is not exceeded (within the symbol identification region set by the normal receiver).

The to-be-transmitted symbol determining device 13B inputs, to the modulator 16, an electric signal that represents a to-be-transmitted signal that has been randomly shifted. The modulator 16 modulates the phase or intensity of light emitted from the light source 15, according to the output signal from the to-be-transmitted symbol determining device 13B.

Figure 15:
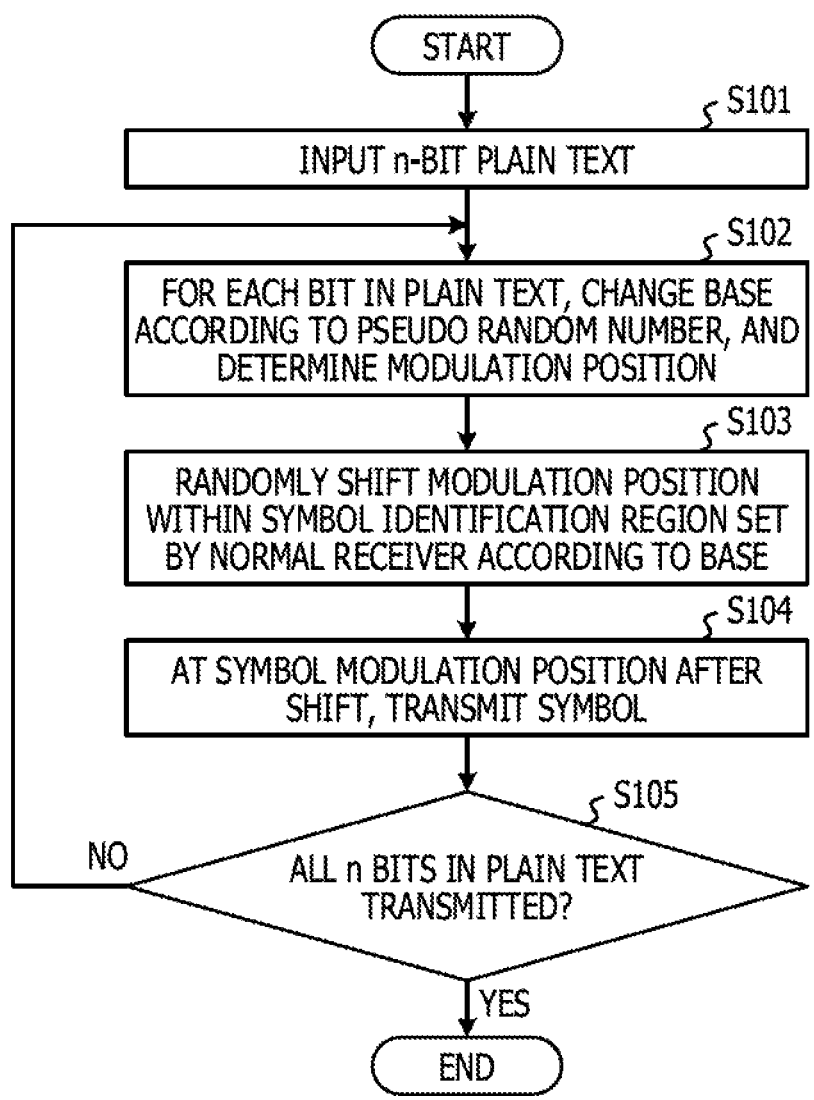
FIG. 15 illustrates an example of an optical transmission method.

The modulated optical signal output from the modulator 16 is amplified by the optical amplifier 17 and is output to the optical transmission path 31. FIG. 15 illustrates an example of an optical transmission method. The optical transmitting device 10A or 10B accepts an input of plain text (S101). Plain text is a bit string represented by a sequence of 1s or 0s. Next, each time plain text corresponding to one symbol is input, the base is changed among a predetermined number of bases (M bases) according to a pseudo random number and a modulation position corresponding to the base is determined (S102). When one bit in plain text is transmitted as an optical signal of one symbol, the base is changed for each bit in plain text. For each base, a different phase or intensity level is given to one bit in plain text. A modulation position is determined according to a correspondence between the symbol and the value (0 or 1) of the plain text for each base.

The modulation position, which is determined by plain text corresponding to one symbol and the selected base is randomly shifted within a range in which a threshold suitable to the base is not exceed, such as, for example, the symbol identification region set by the normal receiver (S103). In a random shift, a modulation position may be randomly selected from two or more predetermined shift-to positions. For example, an analog shift to an arbitrary position may be made along a phase rotation angle or intensity axis within the symbol identification region.

At the symbol position after the random shift, the symbol is transmitted as an optical signal (S104). There is no limitation to the number of photons at that time. Even if the number of photons is increased and the effect of quantum fluctuation is small, an eavesdropper may not be capable of correctly inferring the original symbol transmission position.

Whether there is plain text yet to be transmitted is decided (S105). S102 to S104 are repeated until all plain texts are transmitted. By using the random number generator 18, the optical transmitting device 10A in FIG. 9 and the optical transmitting device 10B in FIG. 14 randomly shift the symbol position determined according to the base within the symbol identification region. A pseudo random number generator that creates a pseudo random number from a seed value that is not shared with the normal receiving device may be used as the random number generator 18, instead of the physical random number generator 180 in FIG. 11 and the physical random number generator 280 in FIG. 13. If the normal receiver knows at least the base, the normal receiver appropriately sets the threshold T used for symbol identification or the symbol identification region determined by the threshold T and makes a decision on the symbol. Accordingly, the modulation position before a shift may not be identified. Therefore, as long as the modulation position determined by the base and plain text corresponding to one symbol is randomly shifted in the symbol identification region set by the normal receiver, a pseudo random number may be used. Even if an eavesdropper measures received light at a relatively high S/N ratio because the number of photons has been increased, the probability that the true symbol position is correctly inferred may be reduced.

As the shift-to position of the true symbol position, one shift-to position may be randomly determined from a plurality of predetermined positions, according to the value of a physical random number (or a pseudo random number that does not share a seed value with the normal receiving device). For example, as described with reference to FIGS. 5A to 5C and FIG. 8, one of the midpoint between the symbol at the true symbol position and the left adjacent symbol and the midpoint between the symbol at the true symbol position and the right adjacent symbol may be selected as a random shift-to position. In this case, a shift-to position may be randomly determined by using a one-bit physical random number or a one-bit pseudo random number that does not share a seed value. For example, a random number string may be divided into two-bit segments and one shift-to position may be randomly determined from four shift-to positions. For example, a move-to position to which a symbol is randomly shifted may be determined in an analog way by using a laser chaos physical random number generator, instead of discretely determining one shift-to position from a plurality of shift-to positions.

Quantum cryptography described above may be applied to quadrature amplitude modulation (QAM) in which two mutually orthogonal sine waves are used and to quadrature phase shift keying (QPSK). In the case of QPSK, a base is selected for each two bits in plain text corresponding to one symbol, according to an output from the pseudo random number generator 12, after which the modulation position is randomly shifted according to a physical random number or the like.

In encrypted optical communication, the number of photons may be increased while confidentiality for information is maintained. Eavesdropping is reduced and the S/N ratio for the normal receiver is increased, so quantum encryption is applied to long-distant optical communication. On the receiving side, signals may be decoded according to the Y-00 protocol.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmitting device comprising:
    a symbol determining circuit that determines one base from a plurality of bases for each input of plain text corresponding to one symbol and determines a modulation position of the symbol according to the plain text and the base;
    a first random number generator that outputs, to the symbol determining circuit, a first random number which is used to determine the one base in accordance with a synchronizing signal which is in synchronization with the input of the plain text;
    a second random number generator that outputs a second random number in accordance with the synchronizing signal;
    a bias generator that generates, based on the second random number, a bias voltage which is used to randomly shift the modulation position within a signal identification region set based on the base; and
    a modulator that shifts the modulation position based on the bias voltage from the bias generator and modulates light emitted from a light source, according to a shifted position.

2. The optical transmitting device according to claim 1, wherein one shift position is selected from two or more shift positions in the signal identification region according to the second random number as the shifted position, and the modulation position is shifted to the one shift position.

3. The optical transmitting device according to claim 1, wherein the shifted position between a first position and a second position is selected according to the second random number, the first position being provided between the symbol and a symbol adjacent in a first direction, the second position being provided between the symbol and a symbol adjacent in a second direction.

4. The optical transmitting device according to claim 1, wherein the shifted position between a first position and a second position is selected according to the second random number, the first position being provided in an area exceeding a symbol adjacent to the symbol in a first direction, the second position being provided in an area exceeding a symbol adjacent to the symbol in a second direction.

5. The optical transmitting device according to claim 1, wherein the second random number generator is a physical random generator or a pseudo random number generator that does not share a key used to generate a random number between the optical transmitting device and a normal optical receiving device.

6. The optical transmitting device according to claim 1, wherein the modulation position within the signal identification region is shifted in an analog way, according to the second random number.

7. The optical transmitting device according to claim 1, wherein the modulator modulates a phase of the light emitted from the light source, according to the shifted position.

8. The optical transmitting device according to claim 1, wherein the modulator modulates an intensity of the light emitted from the light source, according to the shifted position.

9. An optical communication system comprising:
    an optical transmitting device that transmits modulated light to an optical receiving device in the optical communication system through an optical transmission line,
    wherein the optical transmitting device includes:
        a symbol determining circuit that determines one base from a plurality of bases for each input of plain text corresponding to one symbol and determines a modulation position of the symbol according to the plain text and the base;
        a first random number generator that outputs, to the symbol determining circuit, a first random number which is used to determine the one base in accordance with a synchronizing signal which is in synchronization with the input of the plain text;
        a second random number generator that outputs a second random number in accordance with the synchronizing signal;
        a bias generator that generates, based on the second random number, a bias voltage which is used to randomly shift the modulation position within a signal identification region set based on the base; and a modulator that shifts the modulation position based on the bias voltage from the bias generator and modulates light emitted from a light source, according to a shifted position.

10. The optical communication system according to claim 9, wherein one shift position is selected from two or more shift positions in the signal identification region according to the second random number as the shifted position, and the modulation position is shifted to the one shift position.

11. The optical communication system according to claim 9, wherein the optical transmitting device includes a random number generator that supplies a random number to the shift circuit in synchronization with the each input of the plain text, wherein the shifted position between a first position and a second position is selected according to the second random number, the first position being provided between the symbol and a symbol adjacent in a first direction, the second position being provided between the symbol and a symbol adjacent in a second direction.

12. The optical communication system according to claim 9, wherein the shifted position between a first position and a second position is selected according to the second random number, the first position being provided in an area exceeding a symbol adjacent to the symbol in a first direction, the second position being provided in an area exceeding a symbol adjacent to the symbol in a second direction.

13. The optical communication system according to claim 9, wherein the modulator modulates a phase of the light emitted from the light source, according to the shifted position.

14. The optical communication system according to claim 9, wherein the modulator modulates an intensity of the light emitted from the light source, according to the shifted position.

15. An optical transmission method comprising:
determining one base from a plurality of bases for each input of plain text corresponding to one symbol and determining a modulation position of the symbol according to the plain text and the base;
outputting, to the symbol determining circuit, a first random number which is used to determine the one base in accordance with a synchronizing signal which is in synchronization with the input of the plain text;
outputting a second random number in accordance with the synchronizing signal;
generating, based on the second random number, a bias voltage which is used to randomly shift the modulation position within a signal identification region set based on the base;
shifting the modulation position based on the bias voltage from the bias generator; and
modulating light emitted from a light source, according to a shifted position shifted by the shifting.

16. The optical transmission method according to claim 15, further comprising:
selecting randomly one shift position from two or more shift positions in the signal identification region according to the second random number as the shifted position; and
shifting the modulation position to the one shift position.

17. The optical transmission method according to claim 15, further comprising:
selecting randomly the shifted position between a first position and a second position according to the second random number, the first position being provided between the symbol and a symbol adjacent in a first direction, the second position being provided between the symbol and a symbol adjacent in a second direction.

18. The optical transmission method according to claim 15, further comprising:
selecting randomly the shifted position between a first position and a second position according to the second random number, the first position being provided in an area exceeding a symbol adjacent to the symbol in a first direction, the second position being provided in an area exceeding a symbol adjacent to the symbol in a second direction.

* * * * *